United States Patent [19]

Spykerman et al.

[11] Patent Number: 5,072,989
[45] Date of Patent: Dec. 17, 1991

[54] PIVOTED ARM CUPHOLDER

[75] Inventors: David J. Spykerman, Holland; David P. Marcusen, Zeeland; Scott W. Doenges, Holland, all of Mich.

[73] Assignee: Prince Corporation, Holland, Mich.

[21] Appl. No.: 583,666

[22] Filed: Sep. 17, 1990

[51] Int. Cl.$^5$ .............................................. A47C 7/62
[52] U.S. Cl. .................................. 297/194; 296/37.8
[58] Field of Search ..................... 108/26, 145, 44; 297/194, 188, 37.8, 37.5; 248/311.2, 313; 224/281, 273, 275, 42.42, 42.44; 24/339

[56] References Cited

U.S. PATENT DOCUMENTS

| | | | |
|---|---|---|---|
| 3,497,076 | 4/1968 | O'Brien | 211/1.3 |
| 4,040,659 | 8/1977 | Arnold | 297/194 |
| 4,417,764 | 11/1983 | Marcus et al. | 297/194 |
| 4,733,908 | 3/1988 | Dykstra et al. | 297/194 |
| 4,756,572 | 7/1988 | Dykstra et al. | 297/194 |
| 4,759,584 | 7/1988 | Dkystra et al. | 297/194 |
| 4,792,184 | 12/1988 | Lindberg et al. | 297/194 |
| 4,818,017 | 4/1989 | Dykstra et al. | 297/194 |
| 4,828,211 | 5/1989 | McConnell et al. | 297/188 |
| 4,943,111 | 7/1990 | VanderLaan | 297/194 |
| 4,953,771 | 9/1990 | Fisher et al. | 108/44 |
| 4,981,277 | 1/1991 | Elwell | 224/281 |
| 5,007,610 | 4/1991 | Christiansen et al. | 248/311.2 |

FOREIGN PATENT DOCUMENTS 0102841 4/1990 Japan ................................ 296/38.8

Primary Examiner—Kenneth J. Dorner
Assistant Examiner—Cassandra L. Hope
Attorney, Agent, or Firm—Price, Heneveld, Cooper, DeWitt & Litton

[57] ABSTRACT

A container holder for a vehicle is stored in an armrest and can be moved to a use position exposing a container supporting element. Upon returning the container holder to its storage position, at least one arm of the container holder is retracted by the action of the top of the armrest contacting a support member. A slide mechanism couples at least one arm of the holder to the support member to effect the retraction of the arm for storage with the movement of the support member.

22 Claims, 4 Drawing Sheets

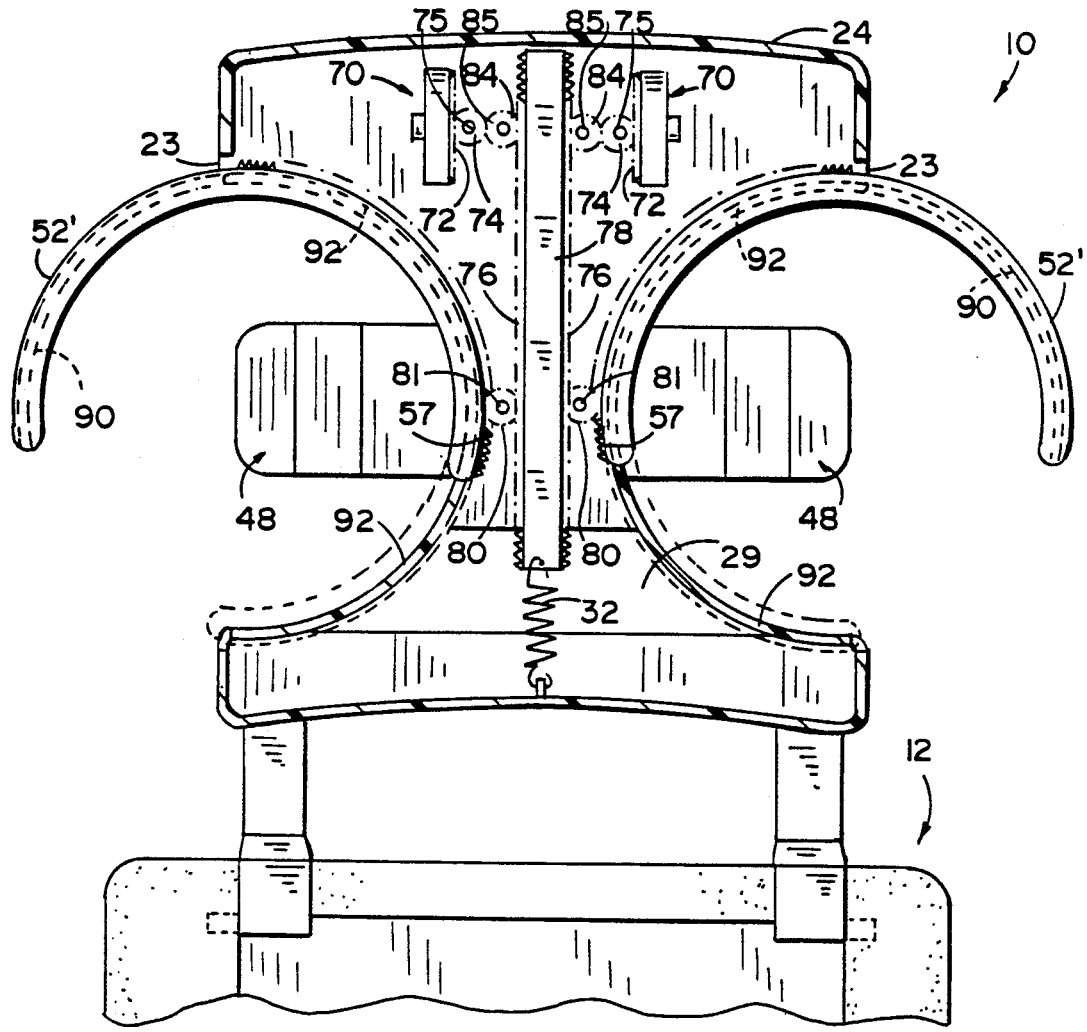
FIG. 7
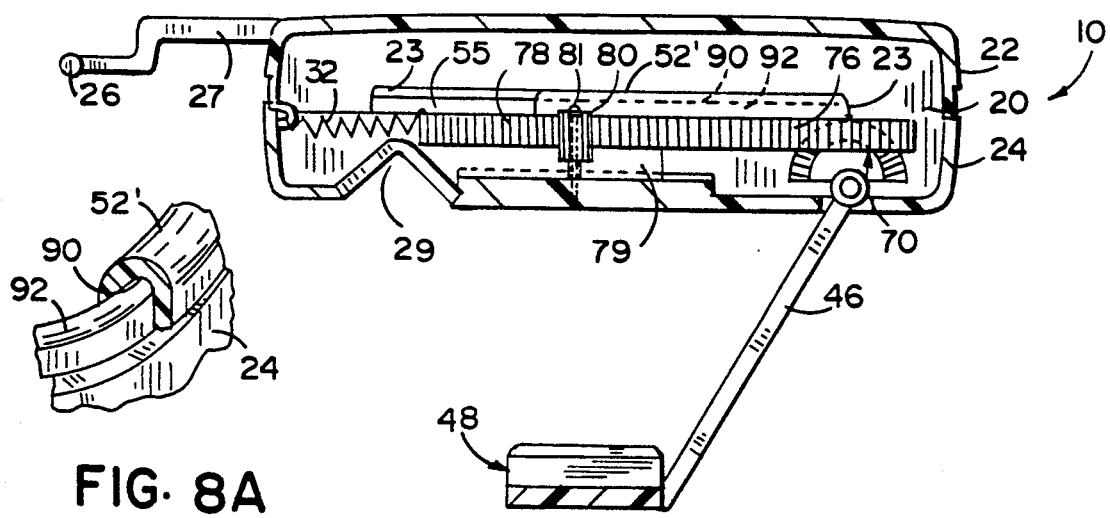
FIG. 8A
FIG. 8

PIVOTED ARM CUPHOLDER

BACKGROUND OF THE INVENTION

The present invention relates to holders for a container and particularly to one for use in connection with a vehicle and more particularly an armrest within a vehicle.

Typical beverage container holders offered as original equipment on automobiles either include a deep cylindrical support recess formed in an armrest, console, or other support member into which a beverage container or cup can be placed or a shallow cylindrical recess formed in the backside of glove compartment door. These structures have certain drawbacks. The armrest or console holder gathers dirt and foreign matter which is difficult to remove because the holder is deep and its floor not readily accessible. The glove compartment door offers little support to the beverage container, so the container can easily be spilled if the automobile is moving and hits a bump. Also, when the door is open for use as a beverage holder, the contents of the glove compartment can be jarred and fall from the open compartment while the car is moving.

There exists a variety of cupholders or container holders utilized for supporting cups, cans or other beverage containers in a vehicle such that the vehicle occupants can support such beverage containers while in the vehicle. U.S. Pat. No. 4,417,764 issued Nov. 29, 1983, is representative of one cupholder structure which is incorporated in the armrest of a vehicle and which can accommodate such containers. U.S. Pat. Nos. 3,497,076 and 4,040,659 also disclose cupholders which move from a storage position within a support structure and automobile to a use position.

Alternatives to the above-described typical container holders frequently include complicated structures which require too much room, particularly if they are to be incorporated into an armrest or console between the front seat of an automobile where other items, such as cassette tape storage compartments, parking brake levers, etc., may be located. In addition to requiring too much room, many of the typical container holders in use today require a considerable effort on the part of the occupant of the vehicle to extend the container holder from its storage position to its use position.

SUMMARY OF THE INVENTION

The container holder of the present invention includes a housing from which at least one spring-loaded arm automatically extends by pivoting outwardly to grip a container in a horizontal manner while a vertical support means drops down to support the container bottom. The housing itself is pivotally mounted to an armrest or other vehicle support structure such that it can be easily moved from a concealed stored position to a use position. The support means, also known as a "bail", is coupled to at least one container arm for actuating the arm to automatically return the arm to a retracted position for storage. Thus, such a container holder is readily accessible by occupants of a vehicle with a minimum amount of effort, is readily accessible for cleaning, and it compactly fits into a limited storage area such as the interior of an armrest.

These and other features, objects and advantages of the present invention will become apparent upon reading the following description thereof together with reference to the accompanying drawings in which:

BRIEF DESCRIPTION OF THE DRAWINGS

FIG. 7 is an enlarged fragmentary top plan view, partly broken-away, of another embodiment of the container holder;

FIG. 8 is a vertical cross-sectional view of the structure shown in FIG. 7; and

FIG. 8A is an enlarged perspective view partly broken-away of the arm guide mechanism of the container holder shown in FIGS. 7 and 8.

DETAILED DESCRIPTION OF THE PREFERRED EMBODIMENT

Figure 1:
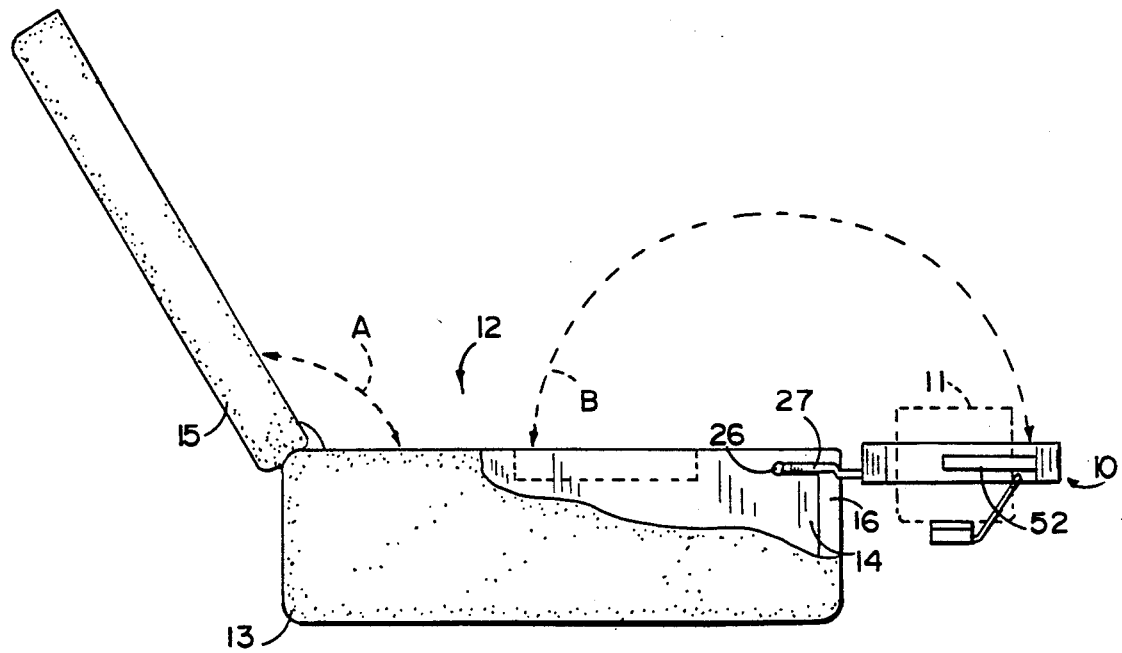
FIG. 1 is a right side elevational view of a vehicle armrest incorporating a container supporting member shown extended therefrom.

Referring initially to FIG. 1, there is shown an armrest 12 which includes a lower half 13 defining a generally rectangular interior storage compartment 14. Armrest 12 also includes a cover 15 which is pivotally mounted along its rear edge to lower half 13 such that cover 15 can be moved between a closed, storage position shown in FIG. 2 and an open position shown in FIG. 1 by pivoting it as indicated by arrow A. Container holder 10 for cups, cans or other containers 11, which embodies the present invention is pivotally mounted to the forward edge of the inside of compartment 14 near front wall 16 of the lower half 13 of armrest 12.

Figure 3:
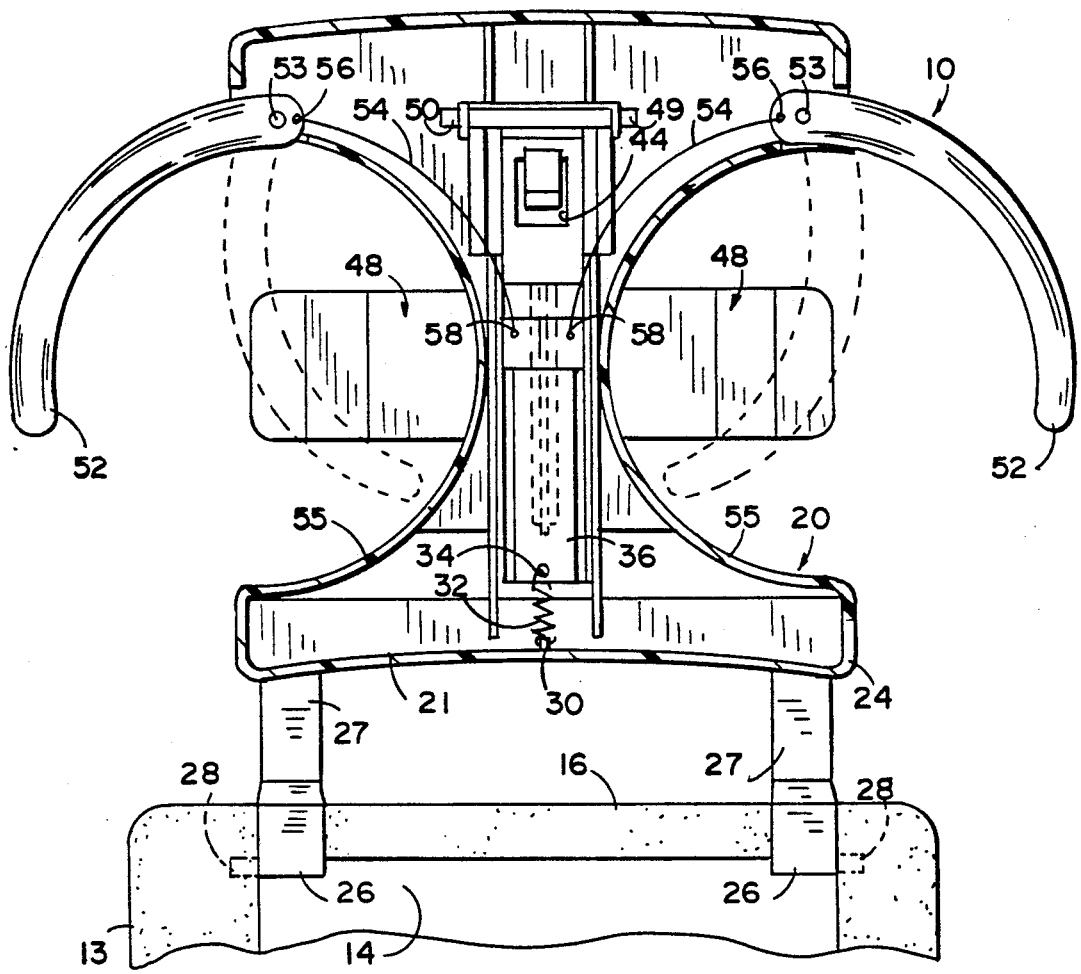
FIG. 3 is an enlarged fragmentary top plan view of the container holder showing its support arms in solid lines in their container supporting position and showing its support arms in dotted lines in their stored position.
Figure 4:
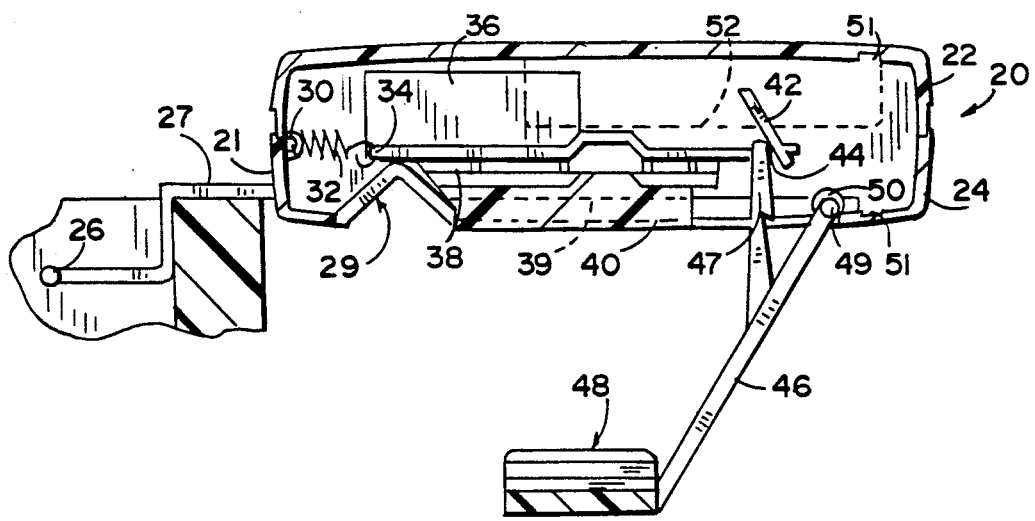
FIG. 4 is an enlarged fragmentary vertical cross-sectional view of the container holder shown in an extended use position.

Container holder 10 includes a molded polymeric housing 20, as best seen in FIG. 4, which housing is divided into an upper section 22 and a lower section 24 suitably joined during assembly of the container holder 10. The housing and the container supporting elements mounted thereto pivot from a stored position inside armrest 12 to a use position, as shown by arrow B, by means of pivot arms 26 integral with lower housing section 24 and including rods 27 which extend outwardly from opposite sides of the lower section 24 of housing 20. The pivot arms 26 ar inserted into apertures 28 formed in the sides of lower half 13 of armrest 12 near the front wall 16, as best seen in FIG. 3. Pivot arms 26 are sufficiently resilient such that they can be deflected for the insertion of container holder 10 into apertures 28 of armrest 12 during assembly.

Figure 5:
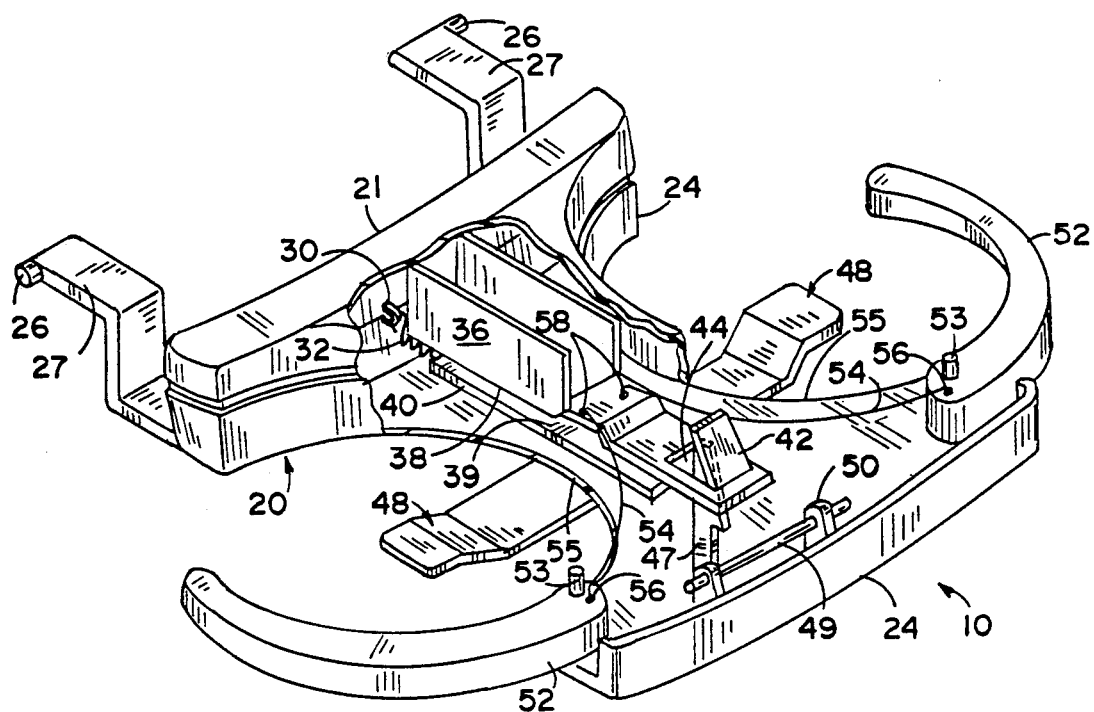
FIG. 5 is an enlarged front perspective view partly broken-away of the container holder in a use position.

The rear wall 21 of the lower section 24 of housing 20 includes a anchor eyelet 30 (FIG. 3) for one end of a tension spring 32 which has its opposite end attached through aperture 34 to a movable link 36. Movable link 36 integrally includes a slide 38 at the bottom, as shown in FIGS. 4 and 5, which slide fits into a slot 39 formed in a track 40 which is integral with the upper surface of the lower section 24 of housing 20. The end of movable link 36 opposite the attachment aperture 34 for spring 32 includes log 42. Log 42 extends up from movable link 36 at a 50° to 60° reverse angle as seen in FIG. 4. At the same end of movable link 36 there is an aperture 44 (FIGS. 3-5) large enough for the upwardly extending end 47 of support means 46 to fit through the aperture. End 47 engages log 42 which acts as a cam follower in response to the upward motion of support means 46 to move movable link 36 to the right as viewed in FIG. 4.

Support means 46 is pivotally mounted to the lower section 24 of housing 20 by means of a pivot pin 49 as seen in FIGS. 3 and 4. Support means 46 terminates at its lower end in a T-shaped support member or bail 48. Support member or bail 48 extends under and supports the bottom of one or more containers 11 supported by the container holder as seen in FIG. 1. The pivot pin 49 fits into apertures of a pair of spaced mounting bosses 50 integrally formed in the forward wall of lower section 24 of housing 20 to pivotally mount the support means 46 and bail 48 to the lower section 24 of housing 20. A laterally extending groove 29 formed in the lower section 24 of housing 20 allows bail 48 to nest into the housing when bail 48 is in its collapsed storage position as seen in FIGS. 2 and 6.

The container holder 10 includes a pair of pivoted arms 52 which pivot outwardly on a horizontal plane from housing 20 as best seen in FIGS. 1, 3, and 5 to partially circumscribe and thereby support a container 11 held by the container holder 10. Pivoted arms 52 are coupled to the spring loaded movable link 36 and actuated by the end 47 of support means 46 to automatically extend and retract from the stored and use positions as container holder 10 is extended from armrest 12 or stored in the armrest respectively. Thus when container holder 10 is pivoted into the armrest storage compartment 14 and cover 15 closed, the cover engages the bail 48 which causes support means 46 and end 47 to move. End 47 actuates, through its impact on log 42, movable link 36, which in turn pivots the arms 52 inwardly to a collapsed or retracted stored position such that the container holder is fully contained within the armrest when stored. The structure for achieving this arm control is now described.

Each arm 52 includes a pivot pin 53 mounted at one end and which is pivotally captured in apertures 51 (FIG. 4) in housing sections 22 and 24 during assembly to pivotally mount the arms 52 on a horizontal plane to housing 20. The arms 52 circumscribe an arc of about 45° and cooperate with curved walls 55 of housing sections 22 and 24 to substantially enclose the outer curved diameter of a container held therein. This relationship of the arms and housing together with the container floor supporting bail 48 is best seen in FIGS. 3 and 5. The arms 52 are coupled to moveable link 36 by spring steel wires 54 which have one end secured in apertures 56 in arms 52 in spaced relationship but generally near pivot pins 53. The opposite ends of the wires 54 are coupled to apertures 58 at the forward end of movable link 36 as best seen in FIGS. 3 and 5. The connecting spring steel wires 54 provide a flexible and yet stiff coupling of the pivoted arms 52 to the movable link 36 which moves in a fore and aft direction to translate the sliding motion of movable link 36 to a pivoting motion of the connected arms 52. The offset of pivot pins 53 and apertures 56 is selected to provide a full range of pivoting arc for the arms 52 in response to the full range of sliding motion of the spring loaded movable link 36 to which arms 52 are coupled.

Figure 2:
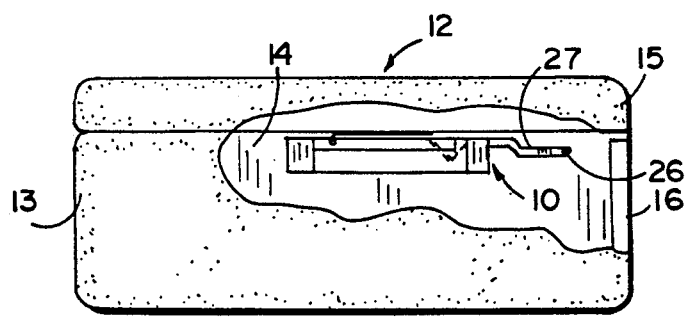
FIG. 2 is a right side elevational view of the armrest shown in FIG. 1 shown partly broken-away and shown with the container holder in a stored position.
Figure 6:
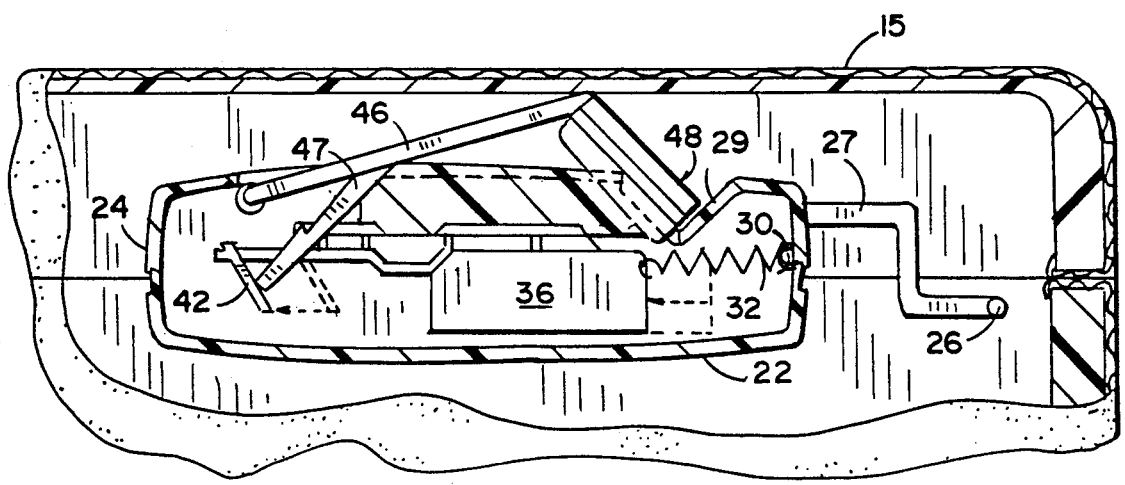
FIG. 6 is an enlarged vertical cross-sectional view of the container holder shown in a stored position.

When the container holder 10 is pivoted, as shown by arrow B in FIG. 1, from its use position to its storage position as illustrated in FIGS. 2 and 6, and cover 15 of armrest 12 is lowered onto the still upwardly extending bail 48, which is held in such position by the force of log 42 acting by the spring tension on end 47 of support means 46, the following occurs. Bail 48 collapses onto the lower section 24 of housing 20 and nests within groove 29. The movement of support means 46 is transmitted to log 42 which forces movable link 36 to travel forward in a straight line motion of slide 38 moving in slot 39 on track 40. This forward motion of movable link 36 is transmitted to arms 52 via wires 54 causing arms 52 to pivot on a horizontal plane towards the center of the container holder. This pivoting action causes arms 52 to fold toward each other thereby occupying a lesser space in both the horizontal and vertical dimension such that they can be fitted into the armrest 12. Thus the overall width and depth of container holder 10 becomes narrow enough such that arm rest storage compartment 14 and cover 15 can envelope it with the container holder occupying a minimal amount of space in the compartment 14. (See FIG. 2)

When container holder 10 is in its storage position inside armrest 12 (shown in FIGS. 2 and 6) and the occupant of the vehicle desires to use the container holder, the cover 15 is lifted, and bail 48 will fully extend due to the force of spring 32 on sliding member 36 and the engagement of members 42 and 47. When spring 32 moves movable link 36 back on track 40, this action is imparted to arms 52 via wires 54 causing arms 52 to pivot outward. This pivoting action causes arms 52 to extend from their collapsed, storage position to their open, use position.

Another embodiment of this invention is shown in FIGS. 7, 8 and 8A. In this embodiment, the interconnection of the support means, arms, and slide includes gear mechanisms instead of wires 54, and elements 42 and 47. In this embodiment, the movable link 36 of the first embodiment is replaced with a sliding rack 78 having teeth 76 on opposite sides which engage the mating teeth of gears 80 which are rotatably mounted adjacent and on opposite sides of rack 78 and on lower housing section 24 by means of vertical axles 81 as seen in FIG. 7. One end of rack 78 is coupled to the tension spring 32 to be urged in a rearward direction thereby. The lower side of rack 78 includes a slide 79 which fits within slot 39 as in the first embodiment to guidably support the rack with respect to the housing 20.

Rack 78 also extends at its forward end between a pair of second rotatable gears 84 which are rotatably mounted to housing section 24 by means of axles 85. Like gears 80, gears 84 have teeth which mesh with teeth 76 of rack 78. Arms 52' include teeth 57 which mesh with the teeth of gears 80 such that the movement of the rack 78 which rotates gears 80 causes the arms to move in an arc between an extended use position as shown in solid lines in FIG. 7 to a retracted stored position as shown in phantom lines. As shown in FIG. 8A, arms 52' have an inner groove 90 which allows them to move back and forth over supporting guide rod 92. Guide slots 23 in the top half 22 of housing 20 restrain the vertical movement of arms 52'.

Rack 78 is moved by the movement of support means 46 which terminates at its upper end in a pair of spaced arcuate gears 70 with inwardly facing gear teeth 72 which mesh with gears 74. Gears 74 are rotatably mounted to the bottom half 24 of housing 20 by means of axles 75 which position the gears 74 in engagement between gear teeth 72 and gears 84. Support means 46 is pivotally mounted to the housing 20 in the same manner as in the first embodiment to move between a lowered use position as seen in FIGS. 7 and 8, and a raised storage position nested within groove 29. As in the prior embodiment, support means 46 terminates at its lower end in a T-shaped support member or bail 48.

When the container holder of FIGS. 7 and 8 is stored in the same manner as the earlier embodiment, the cover of the armrest engages bail 48 of support means 46 to move the rack 78 forwardly which in turn moves the arms 52′ to their retracted position. When the cover 15 is raised however, the spring 32 moves rack 78 rearwardly to extend the arms and the bail. The container holder is then pivoted from the storage area 14 of the armrest 12 as before for use. When the container holder is returned to storage, and before cover 15 is closed, bail 48 is extended as are the arms 52′. As the cover engages bail 48, support means 46 pivots to a closed position thereby driving rack 78 forwardly through gears 84 and 74 and which causes arms 52′ to move inwardly to a stored position.

In both embodiments the spring constant of spring 32 is selected to provide the desired movement of the arms when the container holder is exposed by the raising of armrest cover 15. The container holder also could be mounted in a vehicle storage area other than an armrest as long as the bail interacts with the storage member to provide the arm controlling action.

It will become apparent to those skilled in the art that various modifications to the preferred embodiments of the invention as described herein can be made without departing from the spirit or scope thereof as defined by the appended claims.

The embodiments of the invention in which an exclusive property or privilege is claimed or defined is as follows:

1. A container holder assembly for a vehicle comprising:
a vehicle mounted member with a recess for receiving a container holder for storage;
a container holder and means for mounting said container holder for movement from a storage position in said recess of said vehicle mounted member to a use position in which said container holder extends from said vehicle mounted member, said container holder including a housing and at least one arm movably mounted to said housing and which is extendable and retractable with respect to said housing, said at least one arm being curved to at least partially circumscribe a container when in an extended use position, said container holder further including a support means pivotally mounted to said housing and including a support member spaced below said at least one arm when said support means is in a lowered use position for supporting the bottom of a container, placed thereon; and
slide means for coupling said support means, slidably attached to said housing, and said at least one arm for positive simultaneous movement such that when said container holder is moved from a stored position to a use position, said support member and said at least one arm are extended to their use positions, and when said housing is retracted into said recess, said at least one arm and said support member are retracted to their stored position.

2. A container holder assembly for a vehicle comprising:
a vehicle mounted member with a recess for receiving a container holder for storage;
a container holder and means for mounting said container holder for movement from a storage position in said recess of said vehicle mounted member to a use position in which said container holder extends from an end of said vehicle mounted member, said container holder including a housing and at least one arm movably mounted to said housing and which is extendable and retractable with respect to said housing, said at least one arm being curved to at least partially circumscribe a container when in an extended use position, said container holder further including a support means pivotally mounted to said housing and including a support member spaced below said at least one arm when said support means is in a lowered use position for supporting the bottom of a container placed thereon;
means for coupling said support means and said at least one arm such that when said container holder is moved from a stored position to a use position, said support member and said at least one arm are extended to their use positions, and when said housing is retracted into said recess, said at least one arm and said support member are retracted to their stored position; and
said means for coupling said support member and said at least one arm including a slide slideably mounted to said housing and coupled to said at least one arm and to said support means, and bias means coupled to said slide and to said housing for urging said slide toward a position in which said support member and said at least one arm are extended.

3. The container holder assembly as defined in claim 2 wherein said slide is coupled to said at least one arm by means of a stiffly flexible link.

4. The container holder assembly as defined in claim 3 wherein said stiffly flexible link comprises a spring wire.

5. The container holder assembly as defined in claim 4 wherein said bias means comprises a spring.

6. The container holder assembly as defined in claim 2 wherein said at least one arm includes gear teeth formed thereon and further including gear means for coupling said slide to said gear teeth on said at least one arm.

7. The container holder assembly as defined in claim 2 wherein said support means includes a log and said slide includes a camming surface engaging said log to actuate said support means upon movement of said slide.

8. The container holder assembly as defined in claim 2 wherein said support means includes gear teeth at an end remote from said support member, and said slide includes gear means coupled to said gear teeth of said support means such that movement of said slide moves said support means and thus moves said support member.

9. The container holder assembly as defined in claim 2 wherein said vehicle mounted member comprises an armrest.

10. A container holder assembly for a vehicle armrest comprising:

a vehicle armrest having a pivoted cover and a recess for receiving a container holder for storage therein;

a container holder and means for pivotally mounting said container holder to said armrest for movement from a storage position in said recess of said armrest to a use position extended from said armrest, said container holder including a housing and at least one curved arm movably mounted to said housing for partially circumscribing a container, said at least one arm being extendable and retractable with respect to said housing, between use and storage positions respectively, said container holder further including a support means pivotally mounted to said housing and including a support member spaced below said at least one arm when said support means is in a lowered use position for supporting the bottom of a container placed thereon; and gear means for coupling said support means and said at least one arm for positive simultaneous movement such that when said container holder is moved from a stored position to a use position, said support member and said at least one arm are extended to their use positions, and when said housing is retracted into said recess, said cover engages said support member to retract said at least one arm and said support member to their storage positions.

11. A container holder assembly for a vehicle armrest comprising:

a vehicle armrest having a pivoted cover and a recess for receiving a container holder for storage therein;

a container holder and means for pivotally mounting said container holder to said armrest for movement from a storage position in said recess of said armrest to a use position extended from said armrest, said container holder including a housing and at least one curved arm movably mounted to said housing for partially circumscribing a container, said at least one arm being extendable and retractable with respect to said housing, between use and storage positions respectively, said container holder further including a support means pivotally mounted to said housing and including a support member spaced below said at least one arm when said support means is in a lowered use position for supporting the bottom of a container placed thereon;

means for coupling said support means and said at least one arm such that when said container holder is moved from a stored position to a use position, said support member and said at least one arm are extended to their use positions, and when said housing is retracted into said recess, said cover engages said support member to retract said at least one arm and said support member to their storage positions; and said means for coupling said support member and said at least one arm including a slide slideably mounted to said housing and coupled to said at least one arm and to said support member, and bias means coupled to said slide and to said housing for urging said slide toward a position in which said support member and said at least one arm are extended.

12. The container holder assembly as defined in claim 11 wherein said slide is coupled to said at least one arm by means of a stiffly flexible link.

13. The container holder assembly as defined in claim 12 wherein said stiffly flexible link comprises a spring wire.

14. The container holder assembly as defined in claim 13 wherein said support means includes a log and said slide includes a camming surface engaging said log to actuate said support means upon movement of said slide.

15. The container holder assembly as defined in claim 11 wherein said at least one arm includes gear teeth formed thereon and further including gear means for coupling said slide to said gear teeth on said at least one arm.

16. The container holder assembly as defined in claim 15 wherein said support means includes gear teeth at an end remote from said support member, and said slide includes gear means coupled to said gear teeth of said support means such that movement of said slide moves said support means and thus moves said support member.

17. The container holder assembly as defined in claim 16 including at least a pair of arms movably mounted to opposite sides of said housing.

18. The container holder assembly for a vehicle comprising:

a vehicle mounted member with a recess for receiving a container holder for storage;

a container holder and means for mounting said container holder for movement from a storage position in said recess of said vehicle mounted member to a use position in which said container holder extends from said vehicle mounted member, said container holder including a housing and at least one arm movably mounted to said housing, said at least one arm being curved to at least partially circumscribe a container when in an extended use position, and gear means positively extending said at least one arm automatically when said container holder is moved from said storage position to said use position.

19. The container holder assembly for a vehicle comprising:

a vehicle mounted member with a recess for receiving a container holder for storage;

a container holder and means for mounting said container holder for movement from a storage position in said recess of said vehicle mounted member to a use position in which said container holder extends from an end of said vehicle mounted member, said container holder including a housing and at least one arm movably mounted to said housing, said at least one arm being curved to at least partially circumscribe a container when in an extended use position, and means for extending said at least one arm automatically when said container holder is moved from said storage position to said use position; and said means for extending said at least one arm automatically when said container holder is moved from said storage position to said use position including a slide slideably mounted to said housing and coupled to said at least one arm, and bias means coupled to said slide and to said housing for urging said slide toward a position in which said at least one arm is extended.

20. The container holder assembly as defined in claim 19 wherein said slide is coupled to said at least one arm by means of a stiffly flexible link.

21. The container holder assembly as defined in claim 20 wherein said stiffly flexible link comprises a spring wire.

22. The container holder assembly as defined in claim 21 in which said bias means comprises a spring.

* * * * *